(12) United States Patent
Jeansonne et al.

(10) Patent No.: US 9,213,829 B2
(45) Date of Patent: Dec. 15, 2015

(54) COMPUTING DEVICE INCLUDING A PORT AND A GUEST DOMAIN

(75) Inventors: Jeff Jeansonne, Houston, TX (US); Vali Ali, Cypress, TX (US); James M. Mann, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 90 days.

(21) Appl. No.: 14/118,279

(22) PCT Filed: Jul. 12, 2011

(86) PCT No.: PCT/US2011/043716
§ 371 (c)(1),
(2), (4) Date: Nov. 18, 2013

(87) PCT Pub. No.: WO2013/009302
PCT Pub. Date: Jan. 17, 2013

(65) Prior Publication Data
US 2014/0223543 A1    Aug. 7, 2014

(51) Int. Cl.
*H04L 29/06* (2006.01)
*G06F 21/53* (2013.01)
*G06F 9/455* (2006.01)
*G06F 21/50* (2013.01)

(52) U.S. Cl.
CPC ............ *G06F 21/53* (2013.01); *G06F 9/45533* (2013.01); *G06F 21/50* (2013.01); *G06F 2009/45579* (2013.01); *G06F 2009/45587* (2013.01)

(58) Field of Classification Search
CPC ..... G06F 21/53; G06F 21/50; G06F 9/45533; G06F 2009/45587; G06F 2009/45579
USPC ........ 726/16, 17, 2, 22; 711/6, 206, 203, 207; 710/8, 9, 10, 19; 718/1, 107, 104, 108, 718/102
See application file for complete search history.

(56) References Cited

U.S. PATENT DOCUMENTS

| | | | | |
|---|---|---|---|---|
| 6,003,065 | A | * | 12/1999 | Yan et al. ................ G06F 13/10 709/200 |
| 7,340,582 | B2 | * | 3/2008 | Madukkarumukumana .............. G06F 11/0712 711/100 |
| 7,797,682 | B2 | | 9/2010 | Stocker |
| 7,797,748 | B2 | | 9/2010 | Zheng et al. |
| 7,877,788 | B1 | * | 1/2011 | Topp ....................... G06F 21/85 713/189 |
| 8,230,149 | B1 | * | 7/2012 | Long ....................... G06F 13/12 710/305 |

(Continued)

FOREIGN PATENT DOCUMENTS

| | | |
|---|---|---|
| KR | 10-2009-0068833 | 6/2009 |
| KR | 10-2009-0100614 | 9/2009 |

(Continued)

OTHER PUBLICATIONS

International Search Report and Written Opinion received in PCT Application No. PCT/US2011/043716, mailed on Feb. 9, 2012, 9 pgs.

(Continued)

*Primary Examiner* — David García Cervetti
(74) *Attorney, Agent, or Firm* — HP Legal Department

(57) ABSTRACT

A first guest domain and an isolated peripheral related task. A peripheral related task to communicate with the peripheral and prevent the first guest domain from communicating with the peripheral.

20 Claims, 6 Drawing Sheets

(56) References Cited

U.S. PATENT DOCUMENTS

| | | | | |
|---|---|---|---|---|
| 8,327,358 | B2* | 12/2012 | Mangione-Smith | G06F 9/5077 717/121 |
| 8,924,708 | B2* | 12/2014 | Yoffe | G06F 21/30 713/152 |
| 8,966,475 | B2* | 2/2015 | Srinivasan | G06F 9/4856 717/174 |
| 2002/0186121 | A1* | 12/2002 | Yoshikawa | G07C 9/00111 340/5.28 |
| 2003/0037237 | A1* | 2/2003 | Abgrall | G06F 21/53 713/166 |
| 2003/0105849 | A1* | 6/2003 | Iwamoto | G06F 21/604 709/223 |
| 2003/0115147 | A1* | 6/2003 | Feldman | G06Q 20/382 705/64 |
| 2003/0167336 | A1* | 9/2003 | Iwamoto | G06F 21/604 709/229 |
| 2004/0221173 | A1* | 11/2004 | Moyer | G06F 13/4013 713/189 |
| 2004/0254013 | A1* | 12/2004 | Quraishi | G07F 17/32 463/29 |
| 2004/0254014 | A1* | 12/2004 | Quraishi | G07F 17/3202 463/29 |
| 2005/0138433 | A1* | 6/2005 | Linetsky | G06F 21/31 726/19 |
| 2006/0029062 | A1* | 2/2006 | Rao | H04L 12/2856 370/389 |
| 2006/0041761 | A1* | 2/2006 | Neumann | G06F 21/32 713/189 |
| 2006/0075285 | A1* | 4/2006 | Madukkarumukumana | G06F 11/0712 714/5.11 |
| 2006/0200819 | A1* | 9/2006 | Cherkasova | G06F 9/45533 718/1 |
| 2006/0200820 | A1* | 9/2006 | Cherkasova | G06F 11/3423 718/1 |
| 2006/0200821 | A1* | 9/2006 | Cherkasova | G06F 11/3423 718/1 |
| 2007/0226497 | A1* | 9/2007 | Taylor | G06F 21/31 713/168 |
| 2008/0028076 | A1* | 1/2008 | Gupta | G06F 9/5077 709/226 |
| 2008/0028397 | A1* | 1/2008 | Gupta | G06F 9/5077 718/1 |
| 2008/0028398 | A1* | 1/2008 | Cherkasova | G06F 9/5077 718/1 |
| 2008/0028399 | A1* | 1/2008 | Gupta | G06F 9/5077 718/1 |
| 2008/0028410 | A1* | 1/2008 | Cherkasova | G06F 9/5061 718/104 |
| 2008/0028411 | A1* | 1/2008 | Cherkasova | G06F 9/5027 718/104 |
| 2008/0151847 | A1* | 6/2008 | Abujbara | H04W 12/06 370/338 |
| 2008/0263363 | A1* | 10/2008 | Jueneman | G06F 21/32 713/184 |
| 2008/0293499 | A1* | 11/2008 | Brewer | G07F 17/32 463/47 |
| 2009/0007100 | A1* | 1/2009 | Field | G06F 21/53 718/1 |
| 2009/0055841 | A1* | 2/2009 | Huang | G06F 3/0622 719/326 |
| 2009/0113128 | A1* | 4/2009 | Zhao | G06F 21/57 711/115 |
| 2009/0138963 | A1* | 5/2009 | Sato | G06F 12/1441 726/17 |
| 2009/0138969 | A1* | 5/2009 | Kim | G06F 21/51 726/22 |
| 2009/0144465 | A1* | 6/2009 | Sato | G06F 21/78 710/37 |
| 2009/0182805 | A1* | 7/2009 | Shivaji-Rao | G06F 17/30194 709/203 |
| 2009/0222814 | A1 | 9/2009 | Astrand | |
| 2009/0239502 | A1* | 9/2009 | Dempo | H04L 12/4011 455/411 |
| 2009/0271861 | A1* | 10/2009 | Yoshida | G06F 21/74 726/17 |
| 2009/0300717 | A1* | 12/2009 | Mandava | G06F 21/554 726/2 |
| 2009/0307705 | A1 | 12/2009 | Bogner | |
| 2010/0031325 | A1* | 2/2010 | Maigne | G06F 9/45533 726/4 |
| 2010/0107160 | A1* | 4/2010 | Srinivasan | G06F 21/57 718/1 |
| 2010/0125679 | A1* | 5/2010 | Tang | G06F 9/4411 710/8 |
| 2010/0153617 | A1* | 6/2010 | Miroshnichenko | G06F 3/061 711/6 |
| 2010/0161847 | A1* | 6/2010 | Riddoch | G06F 12/145 710/22 |
| 2010/0175108 | A1 | 7/2010 | Protas | |
| 2010/0228943 | A1* | 9/2010 | Deshpande | G06F 12/1081 711/206 |
| 2010/0228945 | A1* | 9/2010 | Deshpande | G06F 12/0815 711/207 |
| 2011/0047378 | A1* | 2/2011 | Chen | H04L 9/3226 713/168 |
| 2011/0060947 | A1* | 3/2011 | Song | G06F 21/53 714/37 |
| 2011/0078797 | A1* | 3/2011 | Beachem | H04L 63/1441 726/25 |
| 2011/0083017 | A1* | 4/2011 | Ali | G06F 21/78 713/185 |
| 2011/0099639 | A1* | 4/2011 | Hwang | G06F 21/50 726/27 |
| 2011/0141124 | A1* | 6/2011 | Halls | G06F 21/57 345/522 |
| 2011/0145814 | A1* | 6/2011 | Mangione-Smith | G06F 9/5077 718/1 |
| 2011/0145821 | A1* | 6/2011 | Philipson | G06F 21/57 718/1 |
| 2011/0145886 | A1* | 6/2011 | McKenzie | G06F 21/57 726/1 |
| 2011/0191825 | A1* | 8/2011 | Kageyama | G06F 21/00 726/3 |
| 2011/0205965 | A1* | 8/2011 | Sprigg | G06F 9/4411 370/328 |
| 2011/0246678 | A1* | 10/2011 | Wu | G06F 3/038 710/11 |
| 2011/0246756 | A1* | 10/2011 | Smith | H04L 9/3252 713/2 |
| 2011/0296411 | A1* | 12/2011 | Tang | G06F 9/45545 718/1 |
| 2011/0314288 | A1* | 12/2011 | Yogev | G06F 21/31 713/172 |
| 2012/0005178 | A1* | 1/2012 | Gazala | G06F 3/1204 707/705 |
| 2012/0011397 | A1* | 1/2012 | Murakami | G06F 11/0712 714/15 |
| 2012/0023265 | A1* | 1/2012 | Liao | G06F 13/387 710/5 |
| 2012/0023270 | A1* | 1/2012 | Nadehara | G06F 9/468 710/22 |
| 2012/0042099 | A1* | 2/2012 | Wong | G06F 21/44 710/9 |
| 2012/0047566 | A1* | 2/2012 | Andersson | G06F 21/31 726/7 |
| 2012/0095919 | A1* | 4/2012 | Hart | G06Q 20/12 705/44 |
| 2012/0110661 | A1* | 5/2012 | Tverskoy | A61B 5/0002 726/16 |
| 2012/0131230 | A1* | 5/2012 | Ady | G06F 21/44 710/8 |
| 2012/0131353 | A1* | 5/2012 | Nasir | G06F 21/42 713/189 |
| 2012/0161924 | A1* | 6/2012 | Lin | H04W 12/06 340/5.8 |
| 2012/0204233 | A1* | 8/2012 | Rubio | H04L 67/16 726/4 |
| 2012/0284712 | A1* | 11/2012 | Nimmagadda | G06F 9/5077 718/1 |
| 2012/0290455 | A1* | 11/2012 | Mays | G06F 9/5072 705/34 |

(56) References Cited

U.S. PATENT DOCUMENTS

| | | | | |
|---|---|---|---|---|
| 2012/0311207 | A1* | 12/2012 | Powers | G06F 13/42 710/106 |
| 2012/0311257 | A1* | 12/2012 | Berman | G06F 3/0605 711/115 |
| 2013/0067534 | A1* | 3/2013 | Soffer | G06F 3/0227 726/2 |
| 2013/0340069 | A1* | 12/2013 | Yoffe | G06F 21/30 726/17 |
| 2014/0068248 | A1* | 3/2014 | Kobres | G06Q 20/00 713/155 |
| 2014/0188732 | A1* | 7/2014 | Kobres | H04L 63/0442 705/64 |
| 2014/0241523 | A1* | 8/2014 | Kobres | G06F 21/71 380/28 |
| 2014/0247197 | A1* | 9/2014 | Margulis | H04L 5/0037 345/2.3 |
| 2014/0268229 | A1* | 9/2014 | Kempka | G06F 9/4413 358/1.15 |
| 2014/0281527 | A1* | 9/2014 | Kobres | G06F 21/44 713/168 |
| 2015/0082422 | A1* | 3/2015 | Yoffe | G06F 21/30 726/16 |

FOREIGN PATENT DOCUMENTS

| | | | |
|---|---|---|---|
| KR | 10-2011-0055391 | | 5/2011 |
| TW | 200519583 | A | 6/2005 |
| TW | 200943187 | A | 10/2009 |

OTHER PUBLICATIONS

VMWARE, Harness the Power of Desktop Virtualization, http://www.vmware.com/products/ace/overview.html; retrieved on Jun. 10, 2011.

Juniper Networks Introduces Virtualized Security Solution for Private and Public Clouds, <http://webcache.googleusercontent.com/search?q=cache:U-7obCAQme4J:www.provision.ro/threat-management/network-and-telecommunication-security/enterprise-network-firewall/juniper-networks-introduces-virtualized-security-solution-for-private-and-public-clouds+>; Feb. 17, 2011.

Byron Acohido, USA Today news article, Jetliner crash shows dangers of using tainted USB sticks, Aug. 23, 2010 (3 pages).

Erik Couture, SANS Institute, InfoSec Reading Room, USB—Ubiquitous Security Backdoor, Aug. 25, 2009 (25 pages).

European Patent Office, Communication pursuant to Rules 161(2) and 162 EPC for EP Appl. No. 11869372.0 dated Feb. 19, 2014 (3 pages).

European Patent Office, Extended European Search Report for EP Appl. No. 11869372.0 dated Mar. 30, 2015 (7 pages).

Seth Fogie, Informit, Getting Owned: The USB Keystroke Injection Attack dated Oct. 6, 2010 (4 pages).

The International Bureau of WIPO, International Preliminary Report on Patentability for International Appl. No. PCT/US2011/043716 dated Jan. 23, 2014 (6 pages).

Office Action, CN Application No. 201180071768.2, Date: Jun. 26, 2015, pp. 1-10.

* cited by examiner

COMPUTING DEVICE INCLUDING A PORT AND A GUEST DOMAIN

CROSS-REFERENCE TO RELATED APPLICATION

This application is an national stage application under 35 U.S.C §371 of PCT/US2011/43716, filed July 12, 2011.

BACKGROUND

A virtual chine is a software implementation of a machine that executes instructions like a physical machine. The virtual machine is susceptible to the same malicious attacks as a physical machine. Plug and play can allow a peripheral to be connected to a machine without user involvement to configure the peripheral. If the peripheral was malicious it may infect the virtual machine.

BRIEF DESCRIPTION OF THE DRAWINGS

Some embodiments of the invention are described with respect to the following figures.

DETAILED DESCRIPTION

A computing device may be susceptible to attacks by malicious code. The computing device may be for example a server, desktop, notebook, cell phone, PDA, or another computing device. The malicious code may be for example, malware, viruses, firmware attacks or other. A computing device can execute an operating system which may be attacked by viruses or malware.

A virtual machine may also be known as a virtual domain for hosting an operating system executing in the virtual domain. A physical machine may execute multiple domains. An operating system executing on a domain is susceptible to an attack by viruses and malware that can attack the operating system if executing directly on the physical hardware of the computing device. The domains can be managed and isolated from one another by a hypervisor also known as a virtual machine monitor or in conjunction with one of the domains such as a privileged domain. Each domain on a computing device can execute a peripheral related task. A peripheral related task can be logic or instructions that determine if a peripheral is malicious. A virtual appliance may be used for the purpose of executing the peripheral related task. A virtual appliance can run in a domain. The peripheral related task can scan a peripheral that is attached to the computing device to prevent the peripheral from attacking another domain.

In one example a computing device includes a first guest domain and a peripheral related task isolated from the first guest domain. A port can connect the computing device to a peripheral device. A privileged domain can cause the peripheral related task to be executed to identify the peripheral device. The peripheral related task prevents the first guest domain from communicating with the peripheral if it is determined malicious.

In another example, a method of communicating with a peripheral connected to a computing device includes isolating a peripheral related task from a first guest domain. A virtual appliance can be generated to execute the peripheral related task. The virtual appliance can receive from the peripheral an indication of the type of peripheral. The virtual appliance can validate the type of peripheral. Communication with the peripheral by the first guest domain can be prevented until the type of peripheral is validated.

Figure 1:
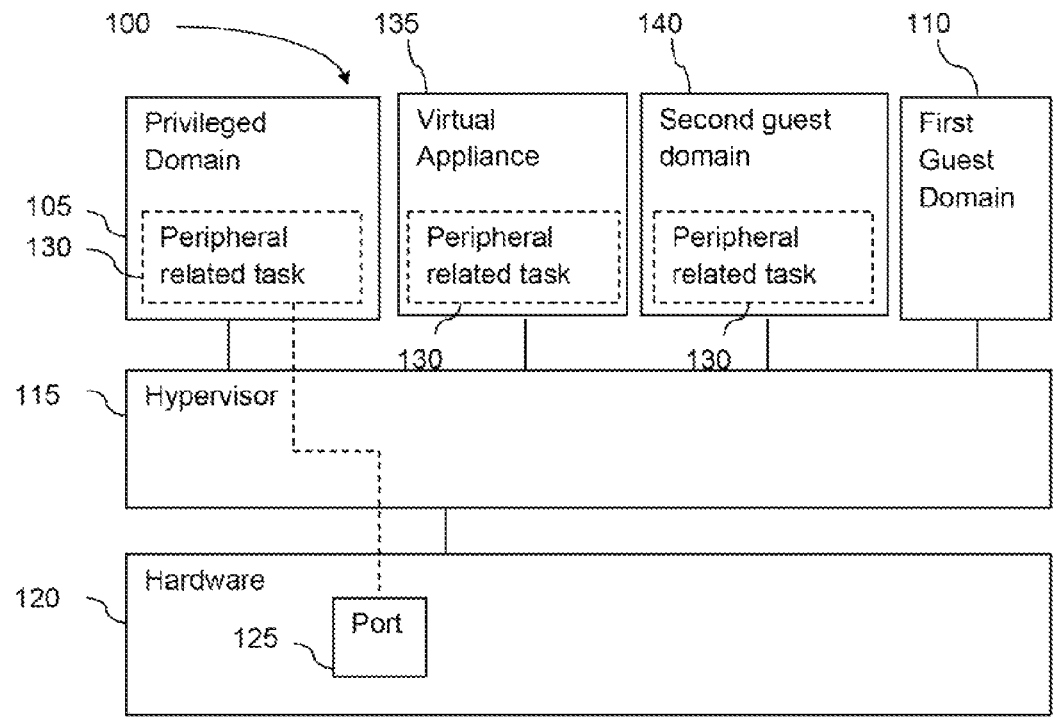
FIG. 1 is a block diagram of a computing device according to an example implementation.

With reference to the figures, FIG. 1 is a block diagram of a computing device 100 according to an example implementation. The computing device 100 can include a first guest domain 110. A privileged domain 105 can be separate from the first guest domain 110. In one example, the privileged domain 105 may not be allowed to execute the peripheral related task 130 and may generate a virtual appliance or another guest domain to execute the peripheral related task 130 to prevent the privileged domain 105 from being attacked by a malicious peripheral. The privileged domain 105 may not allow changes to be made to the privileged domain 105 by other domains that may connect to a potentially malicious peripheral such as a second guest domain 140, or a virtual appliance 135. In another example the privileged domain 105 may be allowed to execute the peripheral related task 130 if the privileged domain 105 is not susceptible to an attack from a malicious peripheral.

The hardware 120 can include a port 125 to connect a peripheral device. A hypervisor 115 can manage the hardware 120 resources. A peripheral related task 130 can be executed in a domain other than the first guest domain for example the privileged domain 105, a virtual appliance 135 or second guest domain 140. The peripheral related task 130 may be instructions to identify the peripheral device. The peripheral related task 130 can prevent the first guest domain 110 from accessing the peripheral if it is determined malicious.

The port 125 is an interface through which data is transferred between a computer and another device. The port can be for example a wired port such as a universal serial bus (USB) port, an IEEE 1394 port, a thunderbolt port, a sate port or another wired connection. The port 125 may be a wireless port such as a Bluetooth® port, a wifi port, a wwan port or another wireless connection. The other device can be a peripheral, for example, a printer, mouse, keyboard, monitor, a storage device, network device or another peripheral.

The hypervisor 115 is a layer for initially communicating directly with hardware 120 replacing the operating system to allow the hardware to run multiple guest operating systems concurrently within multiple domains. In some implementations the hypervisor 115 initiates a domain, such as privileged domain and maps the input'output (I/O) controller to privileged domain to communicate directly with the hardware 120 rather than the hypervisor. In one embodiment, a computer executing a hypervisor may contain three components. The first component is the hypervisor 115 and the second component is the privileged domain 105 which may also be known as domain 0 (Dom0) The privileged domain can be a privileged guest running on the hypervisor 115 with direct hardware access and guest management responsibilities. The third component is a Domain U which can be an unprivileged domain guest (DomU). The DomU can be an Unprivileged guest running on the hypervisor which has no direct access to hardware such as the memory, hard disk, a port or any other hardware 120. The first guest domain can be an example of a DomU.

The peripheral related task 130 can be an application that is executed by a domain. If a peripheral is connected to the port the peripheral may send an indication of what type of device the peripheral is. For example the peripheral may indicate that it is a storage device which may cause the execution of the peripheral related task 130. The execution may be on any of the domains other than the first guest domain such as another guest domain, a virtual appliance, the privileged domain or the hypervisor. For example the peripheral related task may challenge the peripheral by trying to store and retrieve information from the storage device. The task may also scan for malicious content. A peripheral may be malicious when it includes for example a virus, malware or another destructive program that takes advantage of security hole in a domain. A privileged domain is intended to be un-susceptible to viruses and malware, this can be because for example the privileged domain includes trusted software and may not allow writing to the domain by another domain. The privileged domain can execute the peripheral related task 130 for the peripheral device which may cause a malicious code to infect an unprivileged domain but not the privileged domain. Once the peripheral related task 130 has verified that the peripheral is not malicious then an unprivileged domain such as the first guest domain 110 may access the peripheral device. There may be multiple different levels of access that can be given to the first guest domain 110.

Figure 2:
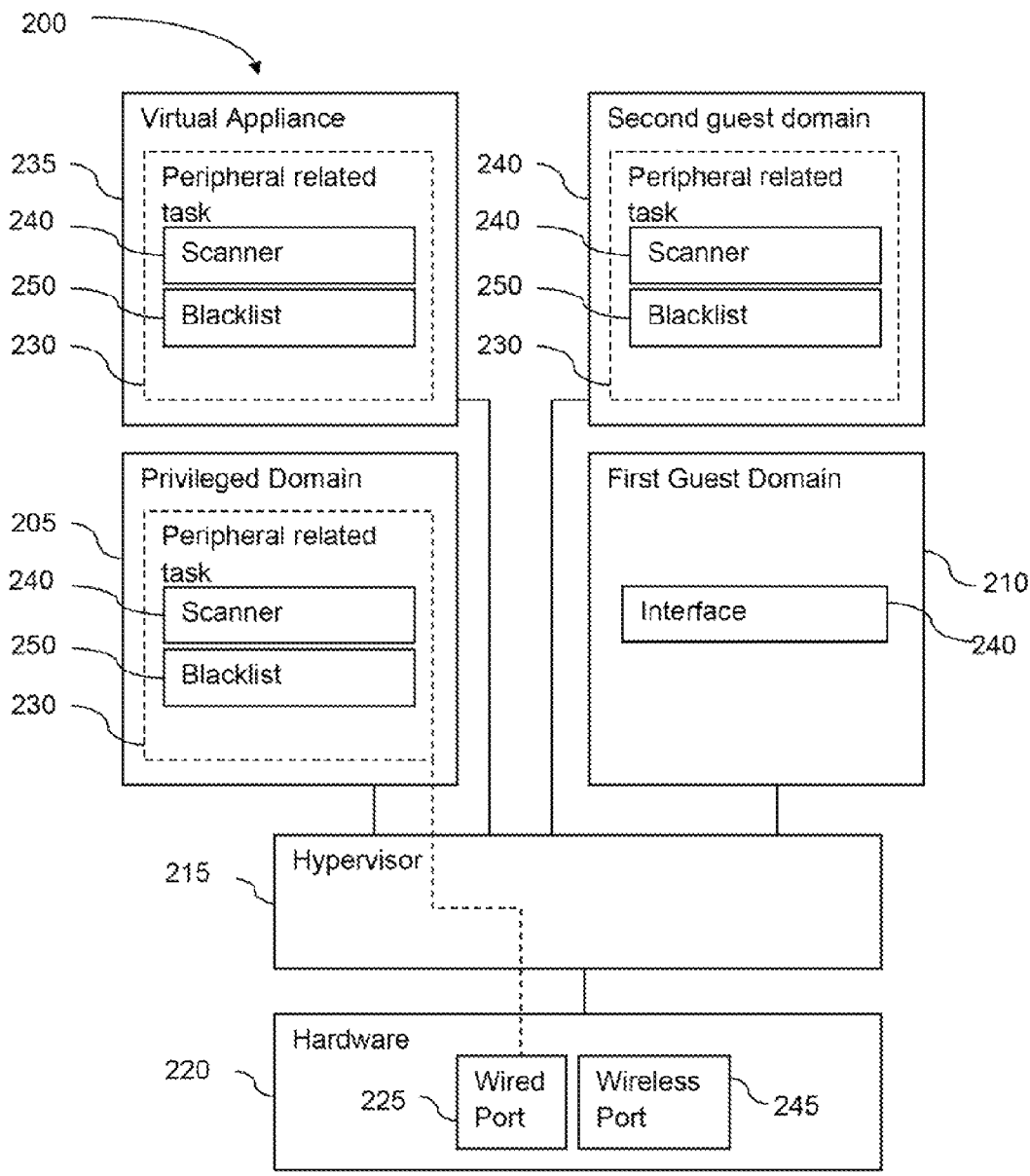
FIG. 2 is a block diagram of a computing device according to an example implementation.

FIG. 2 is a block diagram of a computing device according to an example implementation. The computing device 200 can include, hardware 220 which can include a port such as a wired port 225 or a wireless port 245. The wired port 225 can be for example a universal serial port, an IEEE 1394 port, a thunderbolt port, a seta port or another wired connection. The wireless port 245 can be a port such as a Bluetooth port, a wifi port, a wwan port or another wireless connection.

A domain such as a privileged domain 205 that is outside of and isolated from the first guest domain 210 as a secure quarantine area for all peripheral devices where they can initially be enumerated, analyzed, authenticated, and for remediated as necessary before being exposed to a user operating environment. In addition, some types of devices may be blocked entirely from the first guest domain 210.

Once the hypervisor maps the I/O controller to the privileged domain then the privileged domain is the domain that first enumerates any peripheral that is presented at the hardware 220 level to a port controller. Policy decisions can be made at this level, but the privileged domain 205 can be a highly secure environment. Because of the highly secure environment the peripheral can be connected to a virtual appliance 235 whose sole purpose is to enforce policy settings related to the peripheral device. This virtual appliance 235 can make a decision on how to, or even whether to, expose the peripheral device to a first guest domain 210 based on pre-configured policy settings related to a number of possible mechanisms, device class authentication, device class configuration policy enforcement, device class white list or black list, specific device white list, abstracted user interaction, device class authentication or another policy setting.

As an example, for USB human interface devices, the privileged domain detects device insertion. Subsequent exposure of said human interface device to first guest domain 210 is delayed until the device is analyzed. The privileged domain treats the device as hostile until it can be authenticated by the peripheral related task as being a device as indicated. For human interface devices, such as a keyboard or mouse, this could be performed by presenting a challenge to the user via the display subsystem. This may be done through the secure graphical user interface so that the challenge is not visible to any guest domains such as the first guest domain 210. The challenge may include presenting random characters to the user as well as a graphical keyboard and waiting for a user to enter the characters by either clicking the correct sequence of buttons on the graphical keypad with the mouse or by entering the characters using the keyboard. The peripheral related task 230 can assure that the resulting input is coming from the device that was inserted. In this way, the peripheral related task can authenticate that the device is indeed acting as a human interface device for the machine operator and not simply posing as a human interface device.

A hypervisor 215 can manage the domains such as the privileged domain 205 and the first guest domain 210. In managing the domains the hypervisor can give the privileged domain access to the wired port 225 or the wireless port 245. This can prevent the first guest domain 210 from accessing a peripheral connected to the wired port 225 or the wireless port 245. In one embodiment the privileged domain has direct access to the hardware 220 and the first guest domain 210 does not have direct access to the hardware 220.

The first guest domain 210 may include an interface that can be used to determine the amount of access the first guest domain 210 has to a peripheral connected to a wired port 225 or a wireless port 245 The first guest domain may have for example full access to the peripheral, may have no access to the peripheral, may receive information about the peripheral in text so that it is sure that malicious instructions are not embedded in the data transfer and received by the first guest domain. The text may be in an ascii format and may be a list of files on the peripheral device if the peripheral device is a storage device. The privileged domain 205 or the peripheral related task may create the list of text representing the files on the peripheral device. A user may then be able to select a file that would be accessible to the first guest domain while others would continue to be identified by a text representation. If a file was selected then the privileged domain 205 could send the file to the first guest domain 210 or could allow the first guest domain 210 to access the peripheral device through the privileged domain 205. This could be done through simple remote procedure call (RPC) or other intra-domain communication mechanisms in which only text information of the files is transferred (filenames, sizes, r/w/x attributes, modification dates, etc.). A dialog could be presented to the user allowing them to either allow the peripheral for full 'insertion' into the file system of the first guest domain 210, rejection of the peripheral, or something in between. An example of "something in between" is the user could decide to transfer to/from the storage device over a communication channel such as text over RPC, rather than allowing it to be inserted into the first guest domain environment as part of the first guest domain's file system.

The peripheral related task may also include logic to determine if an auto run file is on the peripheral device. The logic may be in a privileged domain, virtual appliance or another guest domain and can prevent the first guest domain 210 from accessing the auto run file. An auto run file is a file that a domain may search for when a peripheral device is connected. If an auto run file is detected then the domain may run the application or instructions in the auto run file. If the auto run file was to install malicious software a user may install the malicious software by connecting a peripheral to a port on the computing device 200, however by the peripheral related task 240 removing the auto run file or preventing the first guest domain 210 from accessing the auto run file the first guest domain may not automatically install malicious software from a peripheral device.

The peripheral related task 230 may include or have access to a blacklist 250. The black list 250 may include a list of peripheral devices that the first guest domain 210 is prevented from accessing. The peripheral related task 230 may also have access to a white list which is a list of devices that the system may be able to access without performing task on prior to allowing the first guest domain 210 access to the peripheral.

The privileged domain 205 black list 250 policy can be configured such that all of a certain type of device is blocked from being exposed to the first guest domain 210. For example, a policy may be set to instruct the privileged domain 205 to block all USB mass storage class devices from being exposed to the first guest domain 210.

This policy may include a "learn mode" which can enable an administrator to connect a known good device to a platform, at which time the privileged domain 205 can store the device information for later comparison. In normal operation, whenever a peripheral device was attached to a port, the privileged domain can compare each device to the white list and require a match before passing it to the first guest domain 210. This could be very restrictive in that it can only allow devices with the information such as a serial number already in the white list such that the particular device in the white list worked, or it could be configured to be less restrictive such that the serial number were ignored and all those particular devices can be passed through the first guest domain 210.

The peripheral related task 230 may be able to execute a scanner 240. The scanner 240 can scan the contents of the peripheral device for malicious code prior to allowing access to the peripheral device by the first guest domain 210. For example the scanner may scan the contents of the peripheral device for viruses, malware, or other malicious code. The scanner may be able to remove the viruses from the peripheral prior to giving the first guest domain 210 access to the peripheral device or may allow the first guest domain 210 to access materials that were scanned and shown to be free of a virus or malware.

Figure 3:
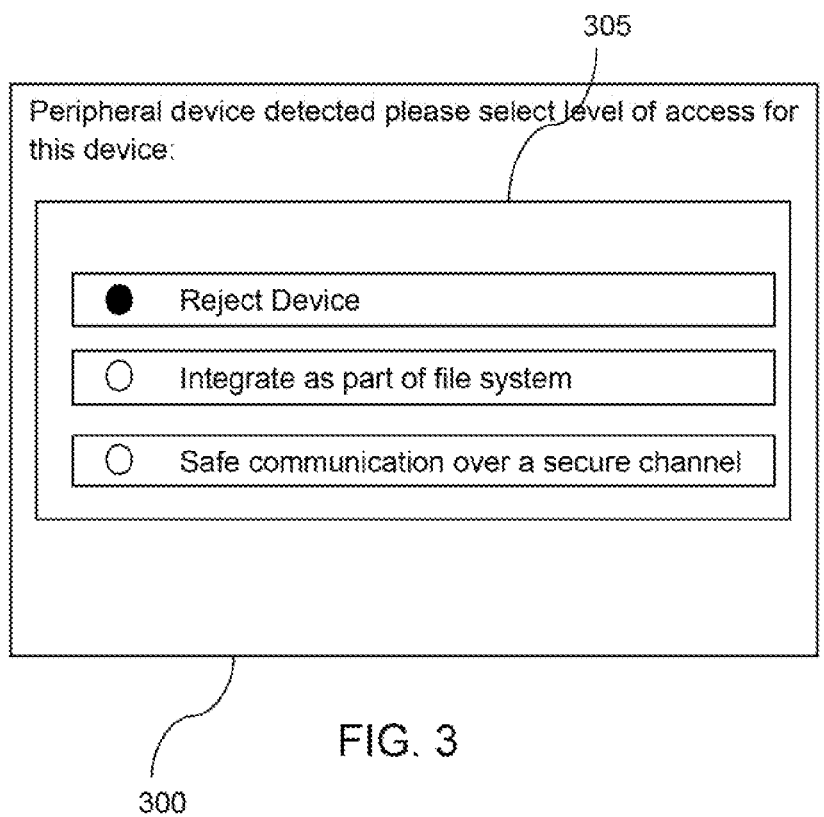
FIG. 3 is an interface according to an example implementation.

FIG. 3 is an interface according to an example implementation. The interface 300 may be a secure graphical user interface. The interface can be used to select the level of access the first guest domain has to communicate with the peripheral device. For example the interface may ask the user to select the level of access for a peripheral device that has been detected by the privileged domain. Examples of the options may be to reject the device, integrate the device as part of the file system, or communicate with the peripheral device over a secure channel. The interface may allow a user to create or manage a policy that is implemented by the peripheral related task or the privileged domain such as creating a white list or black list.

Figure 4:
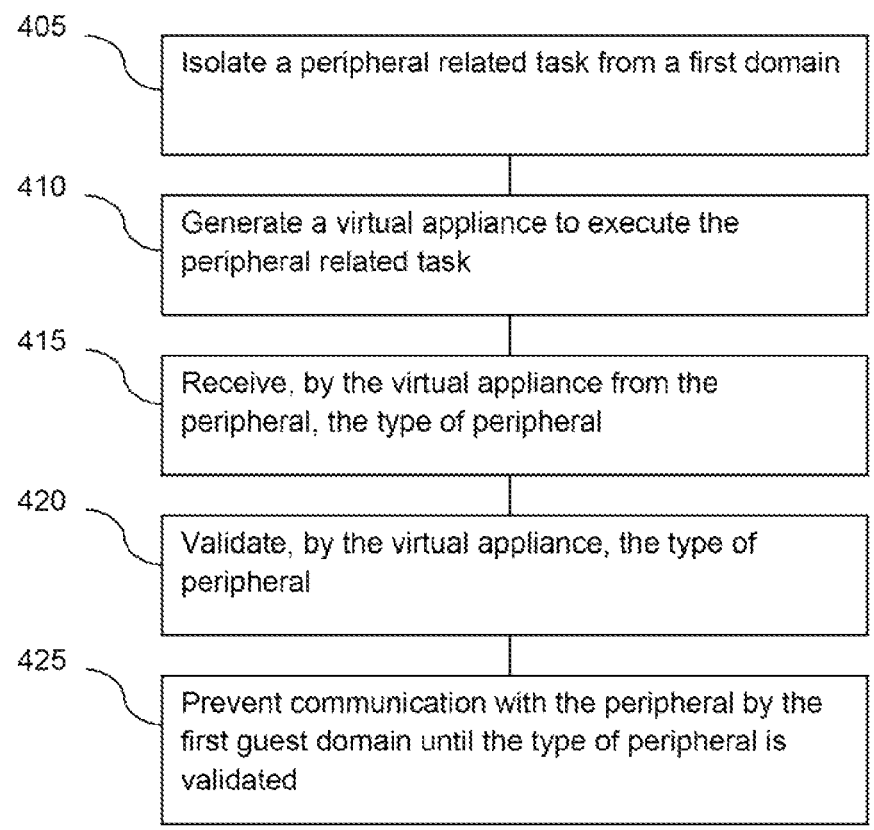
FIG. 4 is a flow diagram of a method of communicating with a peripheral connected to a computing device according to an example implementation.

FIG. 4 is a flow diagram of a method of communicating with a peripheral connected to a computing device according to an example implementation. The method includes isolating a peripheral related task from a first guest domain 210 at 405. The peripheral related task that is isolated from the first guest domain may be a peripheral related task 130. A virtual appliance can be generated at 410 to execute the peripheral related task 130. The generation of the virtual appliance can be initiated by the privileged domain. The virtual appliance can receive from the peripheral an indication of the type of peripheral at 415. The type of peripheral may be for example a storage device, a human interface device such as a keyboard or mouse, or an output device such as a display or printer. The virtual appliance can validate the type of peripheral at 420.

The validation may include asking the user to type a random code on the keyboard this can prevent a storage device from identifying itself as a keyboard and causing keyboard input such as starting programs. The communication with the peripheral by the first guest domain can be prevented at 425 until the type of peripheral is validated.

Figure 5:
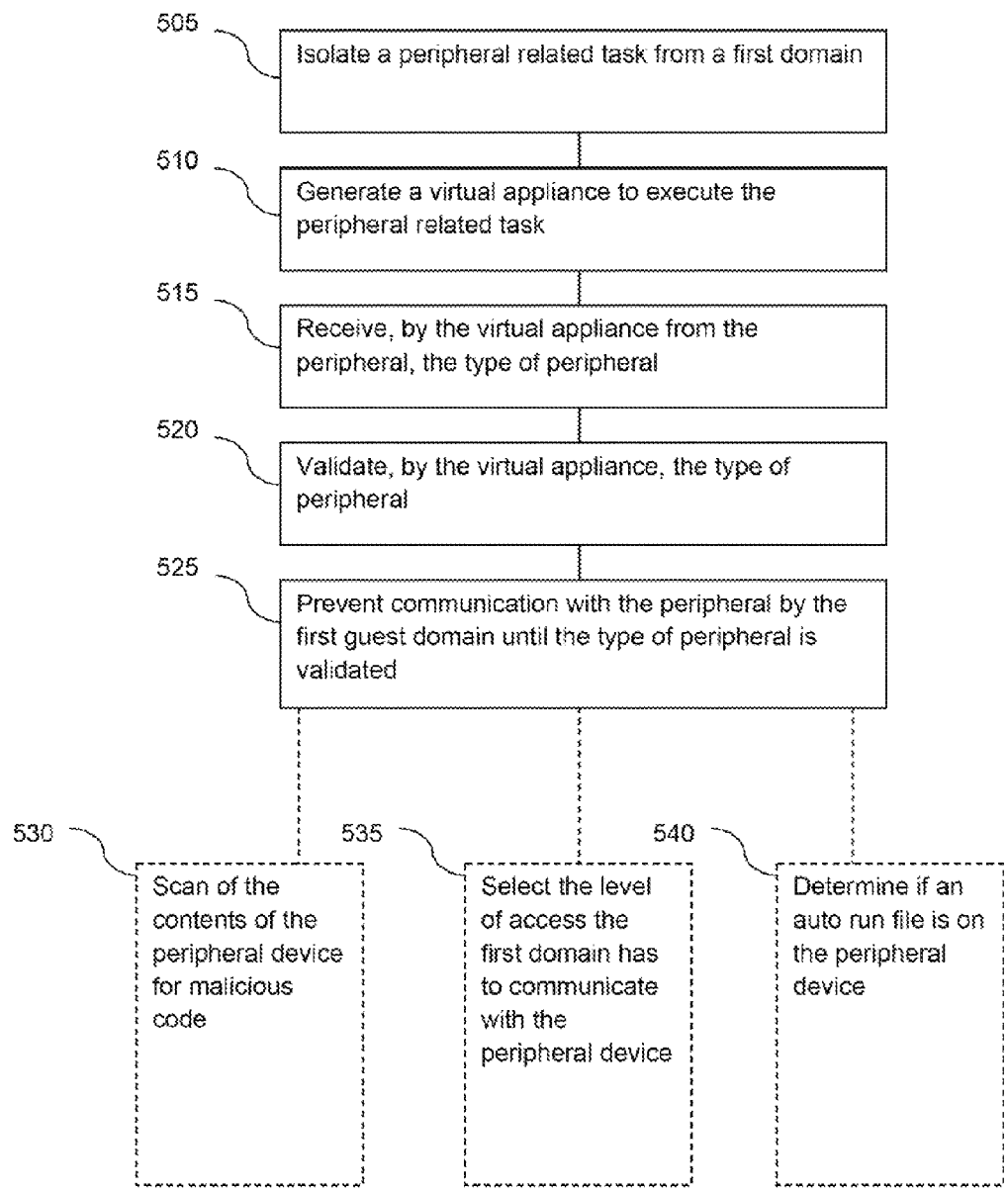
FIG. 5 is a flow diagram of a method of communicating with a peripheral connected to a computing device according to an example implementation.

FIG. 5 is a flow diagram of a method of communicating with a peripheral connected to a computing device according to an example implementation. The method includes isolating a peripheral related task from a first guest domain 210 at 505. The peripheral related task that is isolated from the first guest domain may be a peripheral related task 130. A peripheral related task 130 can be executed at 510 by a virtual appliance. The virtual appliance can perform tasks, such as the peripheral related tasks that may not be executed by a privileged domain. The virtual appliance can receive from the peripheral an indication of the type of peripheral at 515. The type of peripheral may be for example a storage device, a human interface device such as a keyboard or mouse, or an output device such as a display or printer. The virtual appliance can validate the type of peripheral at 520. The validation may include asking the user to type a random code on the keyboard. This can prevent a storage device from identifying itself as a keyboard and causing keyboard input such as starting programs. The communication with the peripheral by the first guest domain 110 can be prevented at 525 until the type of peripheral is validated.

The method can include scanning the contents of the peripheral device for malicious code prior to allowing access to the peripheral device by the first guest domain at 530. The scan of the malicious code may include a virus scan, malware scan or another scan. The level of access the first guest domain has to communicate with the peripheral device can be selected at 535. The level of access can be based on policies implemented by the peripheral related task. The policies may be predetermined or may be selected by the user of the first guest domain. The method may include determining if an auto run file is on the peripheral device at 540. The peripheral related task can prevent the first guest domain from accessing the auto run file. The peripheral related task may remove the auto run file, prevent access to the auto run file by the first guest domain, or allow only secure communications with the files on the peripheral device such as only showing an ascii text based listing of the files on the peripheral device.

Figure 6:
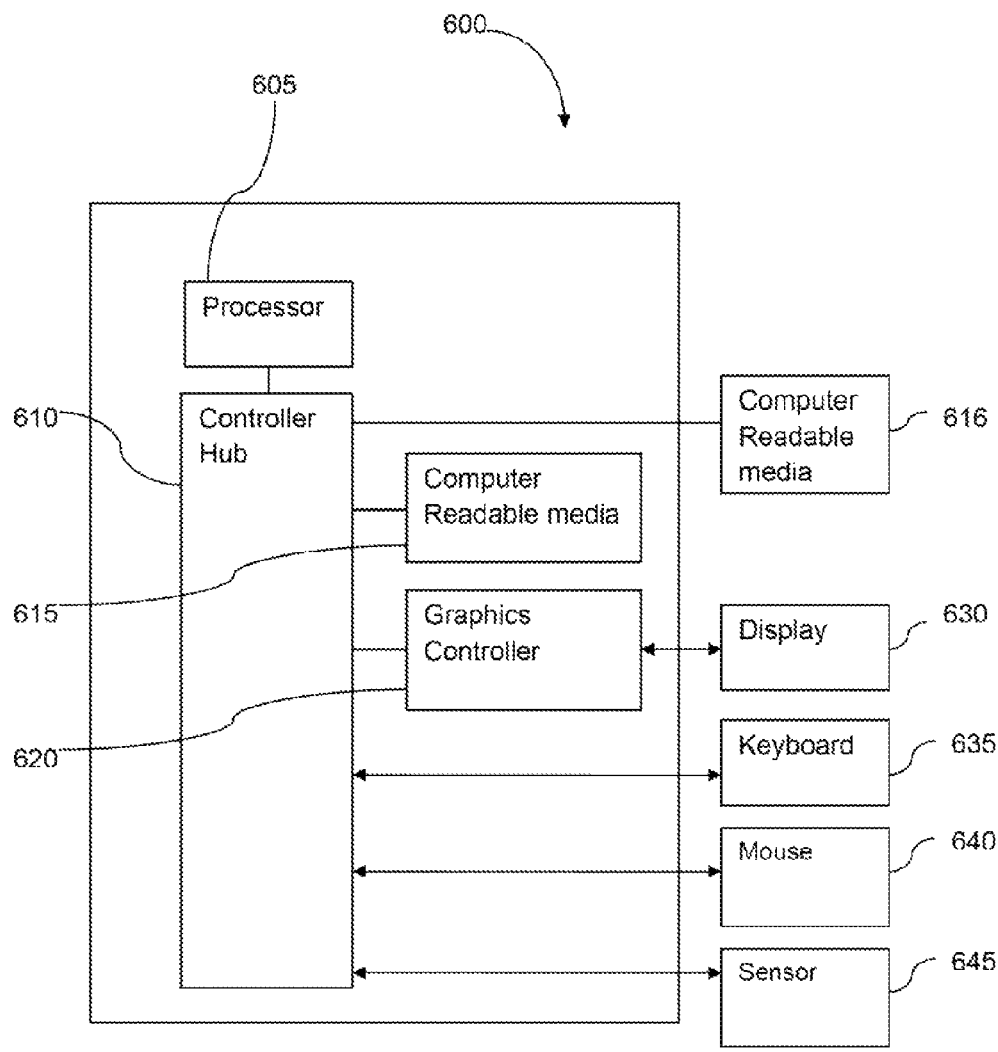
FIG. 6 is a computing system including a computer readable medium according to an example implementation.

FIG. 6 is a computing system including a computer readable medium according to an example implementation. The non-transitory computer readable 615 or 616 medium can include code such as a domain or a peripheral related task that can be executed by a processor 605. The processor 605 can be connected to a controller hub 610. The controller hub can connect to the display 630 through a graphics controller 620, a keyboard 635, a mouse 640 and a sensor 645 such as a webcam. The keyboard 635, mouse 640, display 630, sensor 645 and computer readable media 615 and 616 are some examples of peripherals devices that can be connected to the computing device 600 through a port. The controller hub may include the port or there may be other components between the peripheral and the controller hub 610 that allows communication between the peripheral and the processor 605.

The privileged domain if executed can cause a computing device to isolate a peripheral related task from a first guest domain. The privileged domain can cause a virtual appliance to be generated to execute the peripheral related task The virtual appliance can receive from the peripheral an indication of the type of peripheral. The peripheral related task can validate the type of peripheral and prevent communication with the peripheral by the first guest domain until the type of peripheral is validated. The peripheral related task may scan the contents of the peripheral device for malicious code prior to allowing access to the peripheral device by the first guest domain. The peripheral related task may allow the selection, through an interface, of the level of access the first guest domain has to communicate with the peripheral device.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
a virtual machine monitor (VMM);
a plurality of virtual domains isolated from one another by the VMM, the plurality of virtual domains comprising a first guest domain and a privileged domain;
peripheral related instructions isolated from the first guest domain; and
a port to connect a peripheral device,
the privileged domain to cause the peripheral related instructions to be executed to identify the peripheral device, wherein the peripheral related instructions upon execution prevent the first guest domain from communicating with the peripheral device in response to determining that the peripheral device is malicious.

2. The computing device of claim 1, wherein the privileged domain is to generate a virtual appliance to execute the peripheral related instructions.

3. The computing device of claim 1, wherein the port is a wired port or a wireless port.

4. The computing device of claim 1, further comprising logic in the first guest domain to receive a text list of the contents of peripheral device.

5. The computing device of claim 1, wherein the peripheral related instructions upon execution determine if an auto run file is on the peripheral device, and prevent the first guest domain from accessing the auto run file.

6. The computing device of claim 1, further comprising a blacklist of peripheral devices that the first guest domain is prevented from accessing.

7. The computing device of claim 1, further comprising a scanner to scan contents of the peripheral device for malicious code prior to allowing access to the peripheral device by the first guest domain.

8. The computing device of claim 1, further comprising an interface to select a level of access from among a plurality of levels of access that the first guest domain has to communicate with the peripheral device.

9. The computing device of claim 1, wherein the determining that the peripheral device is malicious is responsive to detecting that the peripheral device is a first type of peripheral device and detecting that the peripheral device is identifying the peripheral device as a second, different type of peripheral device.

10. The computing device of claim 9, wherein the detecting that the peripheral device is the first type of peripheral device comprises:
prompting a user to make an input on the peripheral device; and
detecting the input.

11. A method of communicating with a peripheral connected to a computing device comprising:
isolating a peripheral related task from a first guest domain;
generating a virtual appliance to execute the peripheral related task;
receiving, by the virtual appliance from the peripheral, the type of peripheral;
validating, by the virtual appliance, the type of peripheral; and
preventing communication with the peripheral by the first guest domain until the type of peripheral is validated.

12. The method of claim 11, further comprising scanning contents of the peripheral for malicious code prior to allowing access to the peripheral by the first guest domain.

13. The method of claim 11, further comprising selecting a level of access from among a plurality of different levels of access that the first guest domain has to communicate with the peripheral.

14. The method of claim 11, further comprising determining if an auto run file is on the peripheral, and preventing the first guest domain from accessing the auto run file.

15. The method of claim 11, further comprising:
isolating, using a virtual machine monitor (VMM), a plurality of virtual machines (VMs) from one another, a first VM of the plurality of VMs being the first guest domain, and a second VM of the plurality of VMs being a privileged domain that generates the virtual appliance.

16. The method of claim 11, further comprising:
indicating the peripheral as un-validated in response to detecting that the peripheral is a first type of peripheral and detecting that the peripheral is identifying the peripheral as a second, different type of peripheral.

17. The method of claim 16, wherein the detecting that the peripheral is the first type of peripheral device comprises:
prompting a user to make an input on the peripheral; and
detecting the input.

18. A non-transitory computer readable medium storing instructions that upon execution cause a computing device to:
isolate, using a virtual machine monitor (VMM), a plurality of virtual machines (VMs) from one another, a first VM of the plurality of VMs being a first guest domain, and a second VM of the plurality of VMs being a privileged domain;
cause, by the privileged domain, execution of a peripheral related task isolated from the first guest domain;

receive, by the peripheral related task from a peripheral device, an identification that the peripheral device is a first type of peripheral device;

detect, by the peripheral related task, that the peripheral device is a second type of peripheral device; and in response to detecting that the first type is different from the second type, prevent communication with the peripheral device by the first guest domain.

19. The computer readable medium of claim 18, wherein the instructions upon execution cause the computing device to:

scan contents of the peripheral device for malicious code prior to allowing access to the peripheral device by the first guest domain.

20. The computer readable medium of claim 18, wherein the instructions upon execution cause the computing device to:

select, through an interface, a level of access the first guest domain has to communicate with the peripheral device.

* * * * *